UNITED STATES PATENT OFFICE.

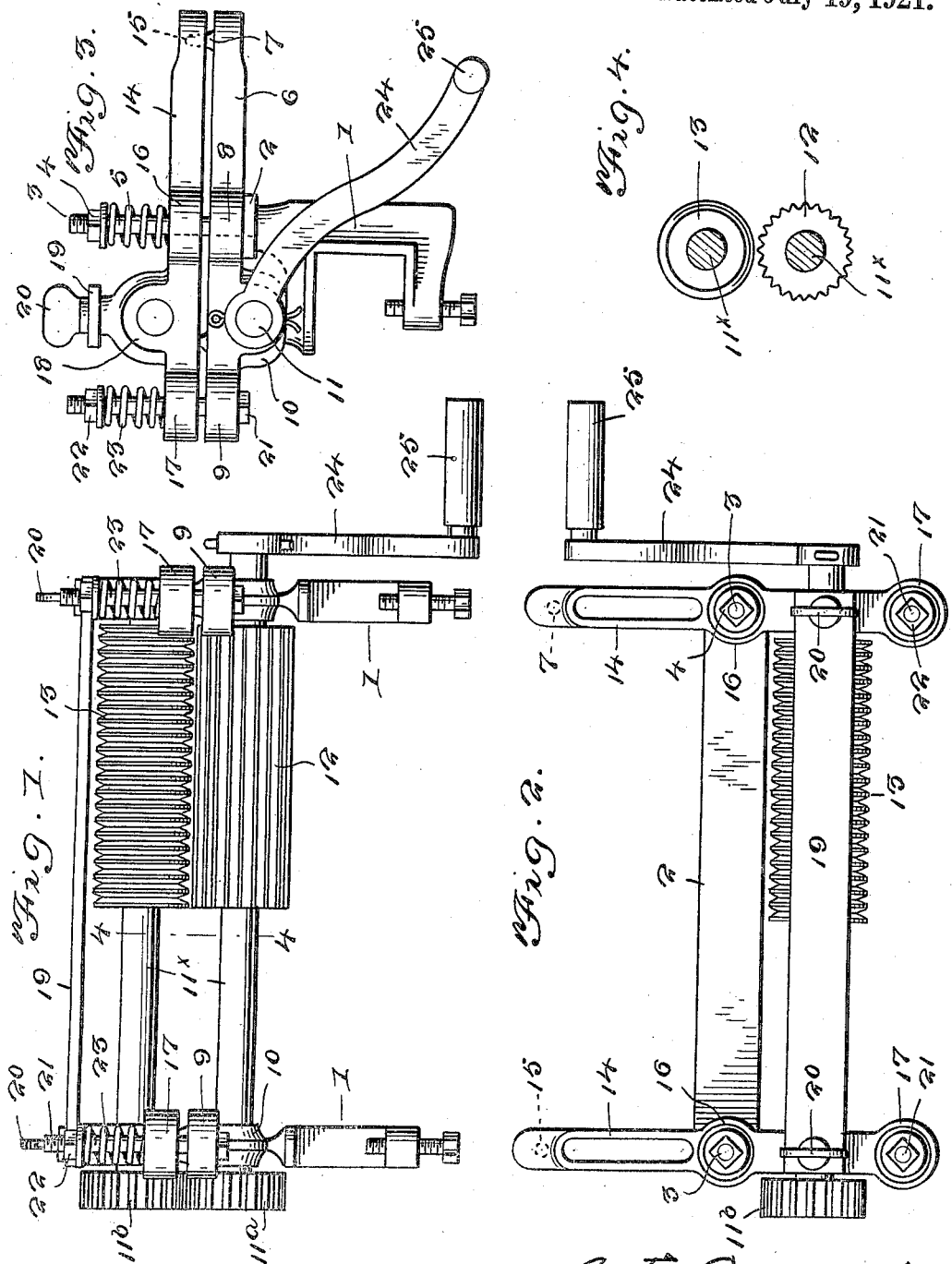

ALFONZO F. COMBS, OF WILKESBORO, NORTH CAROLINA.

MEAT-TENDERING MACHINE.

1,384,991. Specification of Letters Patent. Patented July 19, 1921.

Application filed March 9, 1921. Serial No. 450,908.

*To all whom it may concern:*

Be it known that I, ALFONZO F. COMBS, a citizen of the United States, residing at Wilkesboro, N. C., R. F. D. 2, in the county of Wilkes and State of North Carolina, have invented new and useful Improvements in Meat-Tendering Machines, of which the following is a specification.

The object of my present invention is the provision of a simple and easily operated meat tendering machine of large capacity due to the peculiar construction and relative arrangement of its elements.

To the attainment of the foregoing, the invention consists in the improvement as hereinafter described and definitely claimed.

In the accompanying drawings, forming part hereof:—

Figure 1 is a front elevation of the machine.

Fig. 2 is a top plan thereof.

Fig. 3 is an end elevation of the machine.

Fig. 4 is a detail transverse section on the line 4—4 of Fig. 1.

Similar numerals of reference designate corresponding parts in all of the views of the drawings.

Among other elements my novel meat tendering machine comprises clamps 1 which are connected through the medium of a cross bar 2; it being understood in this connection that the clamps are provided with upstanding threaded pins 3 to receive nuts 4 under which springs 5 are confined.

The machine also comprises lower bearing members 6 on which are upwardly extending pins 7. The said bearing members 6 are superimposed on the end portions of the bar 2 and are provided with apertured portions 8 and 9 and bearing portions 10. The pins 3 on the clamps 1 extend upwardly through the bar 2 and also through the apertured portions 8 of the members 6. Journaled in the bearing portions 10 of the members 6 are the end portions of a shaft 11 which carries a longitudinally fluted tendering roll 12 and is smooth and reduced between the said roll 12 and one of the bearing members 6, the left hand bearing member 6 in Fig. 1, as indicated by 11$^x$. At one end the shaft 11 is provided with a crank 24 on which is a handle 25, and at its opposite end the said shaft 11 is provided with a spur gear 11$^a$. Arranged above and adapted to coöperate with the roll 12 is a circumferentially grooved or ribbed roll 13. The said roll 13 corresponds in length to the roll 12 and is carried by a shaft 11 similar to the first mentioned shaft 11 and having a reduced and smooth portion 11$^x$ in parallelism to the similar portion of the first-named shaft 11 as illustrated in Fig. 1.

Superimposed upon the bearing members 6 are bearing members 14 in which are sockets 15 to receive the pins 7. Said bearing members 14 have apertured portions 16 to receive the pins 3, and also have apertured portions 17 as well as bearing portions 18 on which latter are arranged a cross bar 19 that is secured in position by screws 20 threaded through the bar 19 and into the bearing portions 18. The apertured portions 9 of the bearing member 6 and the apertured portions 17 of the bearing members 14 receive headed and threaded bolts 21 which are equipped with nuts 22 and serve to hold in position springs 23, which springs are interposed between the nuts 22 and the members 14 and serve in combination with the springs 50 to yieldingly press the upper roll 13 against the lower roll 12.

Manifestly when the crank 24 is turned and a piece of meat is fed between the rolls 12 and 13, the said piece of meat will be quickly and thoroughly mangled and reduced to a tender state. It will also be readily noted that the machine as a whole is susceptible of being quickly and thoroughly cleaned.

An important feature of my invention resides in the provision of the reduced and smooth roll portions 11$^x$ between the inner ends of the rolls 12 and 13 and the superimposed bearing members 6 and 14 at the left of Fig. 1. The said roll portions 11$^x$ are advantageous inasmuch as they permit of the free passage and support of a portion of a piece of meat while the remainder of the piece is being passed between the tendering rolls; it being understood in this connection that first one-half of a piece of meat and then the other half thereof are fed between the tendering rolls for the purpose before stated, and the upper shaft 11 is driven from the lower shaft 11 through the medium of the spur gear 11$^a$ and a second spur gear 11$^b$ on the upper shaft 11.

Having described my invention, what I claim and desired to secure by Letters-Patent, is:—

In a meat tendering machine, the combination of clamps having upwardly extending threaded pins, a clamp-connecting cross bar receiving said pins, bearing members on said cross bar and removably receiving said pins and having forward apertured portions and intermediate bearing portions, bearing members on the first-named bearing members and removably receiving said pins and also having forward apertured portions and intermediate bearing portions, nuts mounted on the upper portions of the pins, springs surrounding said pins between the nuts and the adjacent bearing members, bolts connecting the forward portions of the bearing members and equipped with nuts, springs on said bolts and between said nuts and the adjacent bearing members, an upper cross bar on and detachably connected to the bearing portions of the second-named bearing members, tendering rolls having shafts disposed in the bearing portions of the bearing members, said shafts being geared together, the inner ends of said rolls being separated by a space from the bearing members opposite the same, and a crank on one of the shafts through the medium of which the shaft is turned.

In testimony whereof I affix my signature.

ALFONZO F. COMBS.